US006392865B1

(12) United States Patent
Fochtman et al.

(10) Patent No.: US 6,392,865 B1
(45) Date of Patent: May 21, 2002

(54) HIGH-SPEED DUAL-COIL ELECTROMAGNETIC VALVE AND METHOD

(75) Inventors: James Paul Fochtman, Williamsburg; Danny Orlen Wright, Cobbs Creek, both of VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/538,964

(22) Filed: Mar. 31, 2000

(51) Int. Cl.[7] .......................... H01H 9/00; F16K 31/02; B05B 1/30

(52) U.S. Cl. .................. 361/160; 251/129.1; 239/585.1

(58) Field of Search ................................ 361/143, 146, 361/147, 149, 154, 160, 166, 167, 170; 251/129.02, 129.09, 129.1, 129.15, 129.18, 129.2, 129.22; 239/583, 584, 585.1

(56) References Cited

U.S. PATENT DOCUMENTS 5,752,308 A * 5/1998 Maley et al. .............. 29/602.1
6,120,005 A * 9/2000 Wright .................... 251/129.1
6,128,175 A * 10/2000 Wright et al. ............... 361/154

* cited by examiner

*Primary Examiner*—Matthew Nguyen

(57) ABSTRACT

The present invention provides a fuel injector with an armature and a means for biasing the armature toward a first position. A primary coil is wound in a first direction such that, when energized, it develops a magnetic force that opposes the biasing means and causes the armature to move from the first position to a second position. A secondary coil is positioned coaxially with the primary coil. The secondary coil has an at least partially reverse wound portion wound in a second direction opposite the first direction, such that the magnetic field generated by the at least partially reverse wound portion at least partially cancels the magnetic field of the primary coil.

20 Claims, 3 Drawing Sheets

HIGH-SPEED DUAL-COIL ELECTROMAGNETIC VALVE AND METHOD

FIELD OF THE INVENTION

This invention relates to electromechanical actuators in general and particularly to fast-response electromagnetic valves such as fuel injectors for internal combustion engines. More particularly, this invention relates to fast-response fuel injectors having a dual coil configuration.

BACKGROUND OF THE INVENTION

Electromagnetic actuators, such as fuel injectors, typically contain solenoids. A solenoid is an insulated conducting wire wound to form a tight helical coil. When current passes through the wire, a magnetic field is generated within the coil in a direction parallel to the axis of the coil. The direction of the magnetic field generated within the coil depends on the direction of the current passing through the wire as well as the direction in which the wire is wound (e.g., clockwise or counter-clockwise). When the coil is energized, the resulting magnetic field exerts a force on a moveable ferromagnetic armature located within the coil, thereby causing the armature to move from a first position to a second position in opposition to a force generated by a return spring. The force exerted on the armature is proportional to the strength of the magnetic field; the strength of the magnetic field depends on the number of turns of the coil and the amount of current passing through the coil.

There are typically three phases in a fuel injector cycle: the opening phase, the hold-open phase, and the closing phase. For reasons of efficiency and performance, it is desirable to have the opening and closing phases be as fast as possible. It is also desirable to control the current through the injector coils in all phases of the injector cycle such that the amount of energy dissipated within an injector in the form of heat is minimized. Typically, during the opening phase, the magnetic field is required to build as rapidly as possible to minimize the opening time. Because the hold-open phase requires much less force than the opening phase, during the hold-open phase the magnetic field strength should be reduced to the minimum level sufficient to ensure the valve will remain open until the closing phase is initiated by the engine control unit (ECU). By selecting the minimum necessary hold current level during the hold-open phase, the decay time of the magnetic field from the hold-open level to the “break away” level will be minimized. The “break away” level is the magnetic field strength at which the armature separates from the pole piece and mechanical closing begins under the influence of a force exerted by a return spring means.

Traditional peak and hold style fuel injectors use a single driving coil having a low resistance, fixed inductance, and fixed number of turns. During the opening phase, the ECU applies the system voltage (typically 12–14 volts) to the coil and the current builds quickly in the coil due to its low resistance. After the current inside the coil reaches a predetermined value, it may be lowered to a hold value by regulating the voltage. This arrangement allows for the magnetomotive force (MMF) in the injector to build to a high level very quickly, which results in a fast opening time, while minimizing the energy dissipated in the coil during the hold phase. The MMF is proportional to the magnitude of the current in the coil multiplied by the number of turns of the coil wire. Complex electronics are generally required to modulate the current in single coil injectors in order to achieve the low power dissipation described above because most ECUs are only equipped to provide a saturated switch driver and are not designed to modulate the current through single coil injectors in the above-described manner to achieve low power dissipation during the hold phase.

Dual coil injectors are known to reduce heat generation. Dual coil injectors typically have a low resistance primary stage and a high resistance secondary stage. The low resistance primary stage may be activated during the opening phase, resulting in a rapid current rise (due to the low DC resistance of the coil), and a corresponding rapid generation of a magnetic field within the coil. After a predetermined peak current value is reached in the coil, the high resistance secondary coil may be activated by placing it in series with the low resistance primary coil. Placing the coils in series has the desirable effect of increasing the effective DC resistance of the coil pair, and thus reducing the current through the windings and reducing the strength per turn of the resulting magnetic field. However, the added turns of the secondary coil also have the undesirable effect of contributing to the MMF acting on the armature during the hold phase.

Thus, even though the current is reduced, the total MMF acting on the armature during the hold phase is reduced only if the number of turns of the high resistance winding is kept to a minimum. This is because, while each additional turn results in increased resistance and corresponding decreased current in the winding, each turn also results in additional MMF acting on the armature. Accordingly, it is desirable to use wire having a high resistivity, such as brass wire, for the high resistance secondary winding in order to minimize the number of turns required to achieve the desired resistance. Copper, brass, and their alloys are typically used in fuel injector coil windings. Brass alloys may have two to four times the resistance of copper for the same cross sectional area. However, brass windings are often more difficult to manufacture and the wire is more expensive and less commonly available than corresponding sizes of copper wire. Even when wire with high resistivity is used, many active turns of the high resistance secondary coil may be required to achieve the desired resistance and corresponding reduction in current.

Additionally, because the effective inductance of the coil is proportional to the number of effective turns squared, the inductance of the injector increases as more turns are added. Because the closing time of the injector is dependent upon, among other factors, the effective inductance of the coil, it is desirable to minimize the effective inductance of the injector coil. Accordingly, there is a need for a highly efficient dual coil injector design having a fast response time and correspondingly low effective inductance.

SUMMARY OF THE INVENTION

The present invention provides a fuel injector with an armature and a means for biasing the armature toward a first position. A low resistance primary coil is wound in a first direction such that, when energized, it develops a magnetic force that opposes the biasing means and causes the armature to move from the first position to a second position. A high resistance secondary coil is positioned coaxially with the low resistance primary coil. The high resistance secondary coil has an at least partially reverse wound portion wound in a second direction opposite the first direction, such that the magnetic field generated by the at least partially reverse wound portion at least partially cancels the magnetic field of the low resistance primary coil.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENTS(S)

Figure 1:
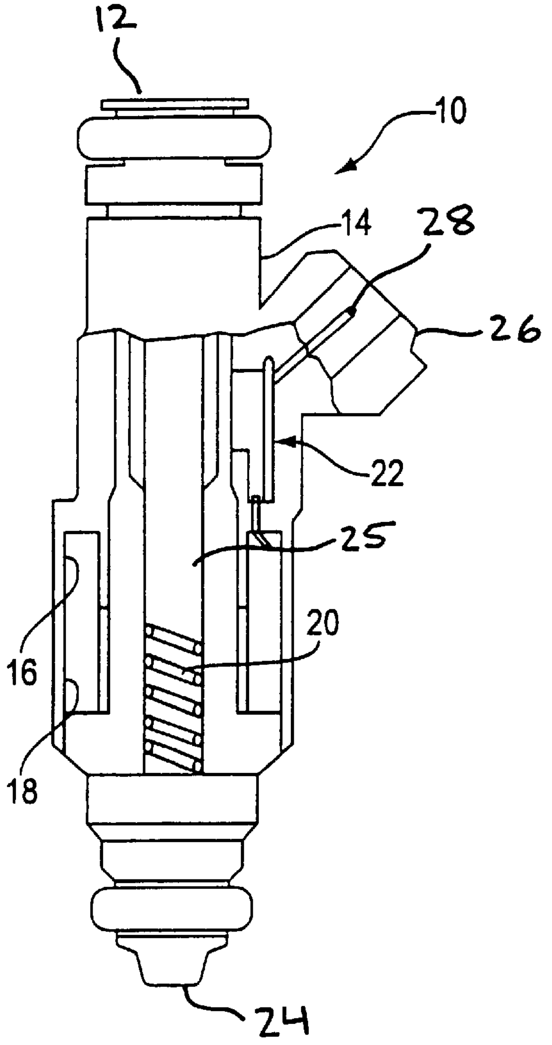
FIG. 1 is a sectional illustration of a fuel injector embodying the principles of the present invention.
Figure 2:
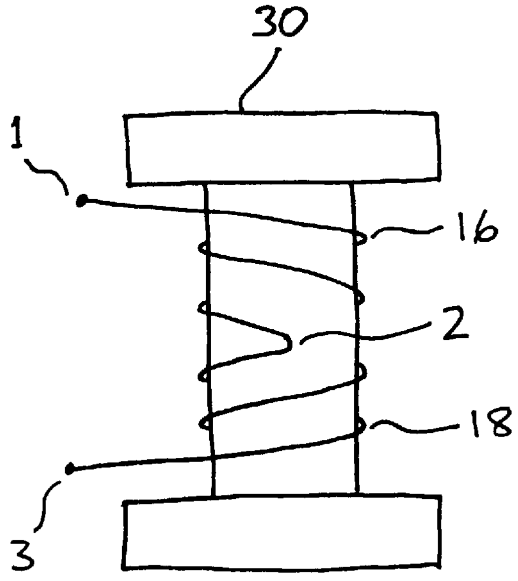
FIG. 2 is a schematic illustration of a preferred embodiment of a dual coil winding arrangement according to the present invention.

FIG. 1 illustrates a fuel injector in accordance with a preferred embodiment of the present invention. It will be appreciated by those skilled in the art that while the present exemplary embodiment will be described primarily in relation to a gasoline fuel injector, liquid propane, diesel or compressed natural gas fuel injectors may also be used. The fuel injector 10 comprises a housing 14 having an upper fuel inlet portion 12, a lower nozzle portion 24, and a wiring harness connector portion 26 having electrical connectors 28. A magnetic circuit is disposed in the housing 14. The magnetic circuit comprises a primary coil 16 having a certain resistance to generate a peak current and a secondary coil 18 having a resistance greater than the resistance of the peak coil 16 to generate a hold current. As shown in FIG. 2, the primary coil 16 and secondary coil 18 may be coaxially wound on a cylindrical bobbin 30 with all or any portion of the secondary coil 18 wound in a reverse direction with respect to the winding direction of the primary coil 16.

Figure 3:
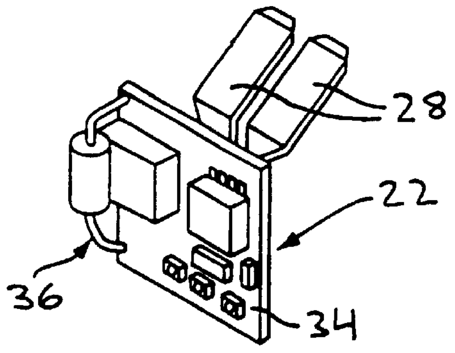
FIG. 3 is a pictorial view of an embodiment of a smart electronic switch according to a preferred embodiment of the present invention.

As shown in FIGS. 1 and 3, in accordance with a presently preferred embodiment, a circuit structure, generally indicated at 22, is disposed in the housing 14 and is electrically connected to the coils 16 and 18 to selectively excite the coils. The circuit structure 22 comprises a circuit board 34, which, in a presently preferred embodiment, may contain smart switch circuitry, generally indicated at 36. The switch circuitry 36 may be constructed and arranged to transition the peak current to the hold current based on a preset threshold.

Figure 4:
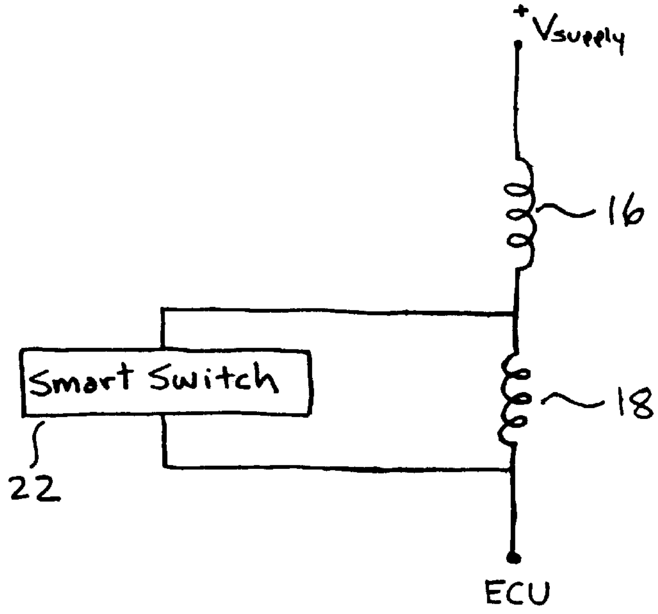
FIG. 4 is a schematic illustration of the coils and smart switch according to a preferred embodiment of the present invention.

FIG. 4 depicts a presently preferred embodiment having a smart switch 22. When a grounding signal is applied by the ECU, the smart switch 22 effectively shorts across the high resistance secondary coil 18, allowing current to build rapidly in the low resistance primary coil 16. When the current reaches a predetermined threshold, the smart switch 22 opens, effectively placing the coils 16 and 18 in series and reducing the current level through the coils to a level sufficient to hold the injector armature in the open position, but less than the predetermined threshold level. Typical peak current values may be approximately 2 to 6 amps and typical hold current values may be approximately 0.5 to 1.5 amps.

An example of a smart electronic switch 22 capable of selectively exciting the low resistance primary coil 16 and the high resistance secondary coil 18 based on a preset threshold is disclosed in U.S. patent application Ser. No. 09/158,637, filed Sep. 22, 1998, now U.S. Pat. No. 6,120,005, and entitled "Dual Coil Fuel Injector Having Smart Electronic Switch," the contents of which is hereby incorporated in its entirety into the present specification by reference.

The coil windings 16 and 18 are best shown in FIG. 2, which schematically illustrates a preferred winding of the coils. As shown in FIG. 2, the wind from connections 1 to 2 defines coil 16, and the wind from connections 2 to 3 defines coil 18. In a presently preferred embodiment, the low resistance primary coil 16 may, for example, consist of about 130 turns of #28 awg copper wire having a total DC resistance of about 1.2 ohms. In a presently preferred embodiment, the secondary hold coil 18 may, for example, consist of about 338 turns of #34 awg copper wire having a total DC resistance of about 10.8 ohms, for a total DC resistance of about 12 ohms. In a presently preferred embodiment, turns of the low resistance primary coil are effectively cancelled by reversing some or all of the high resistance secondary coil turns in relation to the winding direction of the low resistance primary coil turns. For example, if the turns on the low resistance primary coil are wound clockwise, some or all of the turns of the high resistance secondary coil may be wound counter-clockwise.

In a preferred embodiment, approximately ten percent of the turns of the secondary coil 18 are reverse wound. In an alternative preferred embodiment, approximately twenty percent of the turns of the secondary coil 18 are reverse wound. In another alternative preferred embodiment, approximately thirty percent of the turns of the secondary coil 18 are reverse wound. In another alternative preferred embodiment, approximately forty percent of the turns of the secondary coil 18 are reverse wound. In another alternative preferred embodiment, approximately fifty percent of the turns of the secondary coil 18 are reverse wound. In another alternative preferred embodiment, approximately sixty percent of the turns of the secondary coil 18 are reverse wound. In another alternative preferred embodiment, approximately seventy percent of the turns of the secondary coil 18 are reverse wound. In another alternative preferred embodiment, approximately eighty percent of the turns of the secondary coil 18 are reverse wound. In another alternative preferred embodiment, approximately ninety percent of the turns of the secondary coil 18 are reverse wound.

It can be appreciated that many different coil winding combinations could be employed to form the dual coil arrangement of the fuel injector 10. For example, in an alternative preferred embodiment, the entire secondary coil 18 may be reverse wound with respect to the low resistance primary coil 16. Further, the wire used for the coils need not be limited to copper, but may be composed of any suitable material such as, for example, brass. Further, the number of turns of the wires and the gauge of the wires may be any desired number or gauge to provide the desired injector performance. In contrast to the conventional method of winding both primary and secondary coils entirely in the same direction, the present method of reverse winding all or a portion of the secondary coil with respect to the primary coil allows the MMF, inductance and DC resistance to be independently controlled in a coil design.

As shown in Table 1 below, winding the high resistance secondary coil in a direction opposite the low resistance primary coil winding direction, in accordance with a presently preferred embodiment, reduces the effective number of turns of the series combination of coils as well as the effective inductance of the series combination of coils. Accordingly, rapid current decay and corresponding rapid magnetic field decay may be achieved upon de-energizing the coils, improving the response of the fuel injector.

TABLE 1

| Coil Stage | Direction of Winding | Resistance (Ohms) | Inductance (mH) | Active Turns |
|---|---|---|---|---|
| Low Resistance Primary Coil | Clockwise | 1.8 | 1.8 | 180 |
| High Resistance | Clockwise | 5.1 | 0.6 | 100 |
| Secondary Coil | Counter-clockwise | 5.1 | −0.6 | −100 |
| Combined (Net Effective) | | 12.0 | 1.8 | 180 |

A benefit of canceling or partially canceling coil winding turns is that an injector may be designed for an optimal low-power hold-open MMF level without sustaining a consequent increase in inductance. This method of reverse winding also allows the designer to select the total effective series inductance of the coils.

As shown in Table 2 below, a similar coil combination wound in the conventional manner without reversing the winding direction of the secondary coil would have an effective resistance of 12 ohms, an inductance of 8.0 mH and 380 active turns. This is because the inductance of the coil increases in proportion to the square of the number of turns of the coil.

TABLE 2

| Coil Stage | Direction of Winding | Resistance (Ohms) | Inductance (mH) | Active Turns |
|---|---|---|---|---|
| Low Resistance (Primary) | Clockwise | 1.8 | 1.8 | 180 |
| High Resistance | Clockwise | 5.1 | 0.6 | 100 |
| (Secondary) | Clockwise | 5.1 | 0.6 | 100 |
| Combined (Net Effective) | | 12.0 | 8.0 | 380 |

A preferred configuration for effectively controlling temperature rise in the injector housing 14 defines the inner windings as the secondary coil 18 and the outer windings as the primary coil 16. This configuration promotes greater heat exchange between the coils and the injection fluid. Accordingly, in a presently preferred embodiment, the coils 16 and 18 are wound in an overlapping configuration. As shown in FIG. 4, it can be appreciated that the coils may also be arranged end-to-end instead of in an overlapping arrangement.

Figure 5:
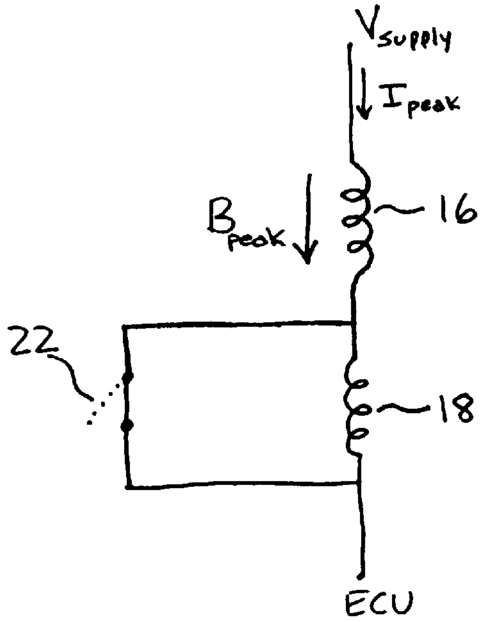
FIG. 5 illustrates the current flow and magnetic fields of the coils during the opening phase of the injector cycle according to a preferred embodiment of the present invention.

FIG. 5 illustrates the current flow (I) and magnetic field (B) directions during the opening phase of the fuel injector cycle. During the opening phase, to initiate motion of the armature 25 and thus open the nozzle portion 24 (FIG. 1), the primary coil 16 is energized by current $I_{Peak}$, producing magnetic field $B_{Peak}$. The resulting magnetic field $B_{Peak}$ exerts a force on the armature 25 causing it to move in opposition to a mechanical return spring means 20 toward the open position. During this phase, the partially reverse wound secondary coil 18 may be shunted out of the circuit.

Figure 6:
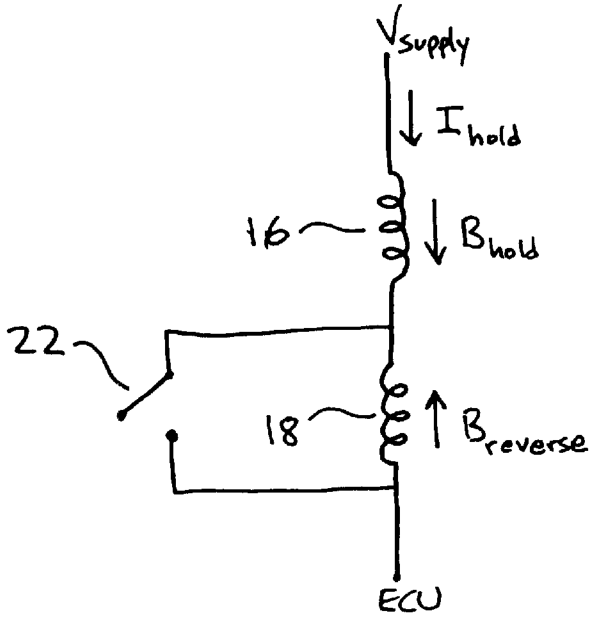
FIG. 6 illustrates the current flow and magnetic fields of the coils during the hold phase of the injector cycle according to a preferred embodiment of the present invention.

As illustrated in FIG. 6, after the armature has reached the open position, the partially reverse wound secondary coil 18 may be placed in series with the primary coil 16. This has the effect of both decreasing the current through the coils to $I_{Hold}$, where $I_{Hold}<I_{Peak}$, (due to the increased resistance resulting from the secondary coil 18), and canceling a portion of the magnetic field generated by the primary coil 16 (due to the opposing magnetic field, $B_{Reverse}$, generated by the reverse winding in the secondary coil 18). Upon de-energization of the coils, the effective magnetic field, $B_{Effective}=B_{Hold}-B_{Reverse}$, collapses rapidly due to the reduced effective inductance of the series combination of coils, thus achieving a rapid return of the armature to the closed position.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but have the full scope defined by the language of the following claims, and equivalents thereof.

What we claim is:

1. A fuel injector comprising:

an armature;

a means for biasing the armature toward a first position;

a primary coil wound in a first direction that, when energized, develops a magnetic force that opposes the biasing means and causes the armature to move from the first position toward a second position;

a secondary coil positioned coaxially with the primary coil and having an at least partially reverse wound portion wound in a second direction opposite the first direction, such that the magnetic field generated by the at least partially reverse wound portion at least partially cancels the magnetic field generated by the primary coil.

2. The fuel injector of claim 1, wherein the inductance of the series combination of the primary and secondary coils is less than the inductance of the series combination of the primary coil and a non-reverse-wound secondary coil having substantially identical physical characteristics to said secondary coil except said non-reverse-wound secondary coil being wound entirely in the same direction as the primary coil.

3. The fuel injector of claim 2, wherein the coils are energized by a self-triggering driver circuit.

4. The fuel injector of claim 2, wherein the fuel injector comprises a liquid propane fuel injector.

5. The fuel injector of claim 2, wherein the fuel injector comprises a gasoline fuel injector.

6. The fuel injector of claim 2, wherein the fuel injector comprises a diesel fuel injector.

7. The fuel injector of claim 2, wherein the fuel injector comprises a compressed natural gas fuel injector.

8. The fuel injector of claim 2, wherein the at least partially reverse wound portion is in the range of 1 to 30 percent of the total secondary coil winding.

9. The fuel injector of claim 2, wherein the at least partially reverse wound portion is in the range of 30 to 70 percent of the total secondary coil winding.

10. The fuel injector of claim 2, wherein the at least partially reverse wound portion is in the range of 70 to 100 percent of the total secondary coil winding.

11. A method of generating a fast closing time in a dual coil fuel injector, the method comprising the steps of:

winding a primary coil in a first direction;

winding a secondary coil at least partially in a second direction opposite the first direction;

aligning the primary coil and secondary coil in a coaxial fashion;

positioning a moveable armature within the coils;

generating a first current in the primary coil and a corresponding first magnetic force on the armature;

moving the armature under the influence of the first magnetic force from a first position toward a second position;

generating a second current in both the primary coil and secondary coil and a corresponding second magnetic force on the armature, wherein the magnetic field generated by the second direction coil windings at least partially cancels the magnetic field generated by the first direction coil windings;

holding the armature in the second position under the influence of the second magnetic force;

removing the current from the coils;

returning the armature to the first position under the influence of a mechanical spring means.

12. The method of generating a fast closing time in a dual coil fuel injector according to claim 11, wherein the inductance of the series combination of the primary and secondary coils is less than the inductance of the series combination of the primary coil and a non-reverse-wound secondary coil having identical physical characteristics to said secondary coil except said non-reverse-wound secondary coil being wound entirely in the same direction as the primary coil.

13. The method of claim 12, wherein the coils are energized by a self-triggering driver circuit.

14. The method of claim 12, wherein the fuel injector comprises a liquid propane fuel injector.

15. The method of claim 12, wherein the fuel injector comprises a gasoline fuel injector.

16. The method of claim 12, wherein the fuel injector comprises a diesel fuel injector.

17. The method of claim 12, wherein the fuel injector comprises a compressed natural gas fuel injector.

18. The method of claim 12, wherein the at least partially reverse wound portion is in the range of 1 to 30 percent of the total secondary coil winding.

19. The method of claim 12, wherein the at least partially reverse wound portion is in the range of 30 to 70 percent of the total secondary coil winding.

20. The fuel injector of claim 12, wherein the at least partially reverse wound portion is in the range of 70 to 100 percent of the total secondary coil winding.

* * * * *